(12) United States Patent
Shin

(10) Patent No.: US 9,894,275 B2
(45) Date of Patent: Feb. 13, 2018

(54) PHOTOGRAPHING METHOD OF AN ELECTRONIC DEVICE AND THE ELECTRONIC DEVICE THEREOF

(71) Applicant: Samsung Electronics Co., Ltd., Suwon-si, Gyeonggi-do (KR)

(72) Inventor: Young-Wook Shin, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 16 days.

(21) Appl. No.: 14/582,681

(22) Filed: Dec. 24, 2014

(65) Prior Publication Data

US 2015/0229849 A1 Aug. 13, 2015

(30) Foreign Application Priority Data

Feb. 11, 2014 (KR) .................. 10-2014-0015389

(51) Int. Cl.
*H04N 5/232* (2006.01)
*G06F 1/32* (2006.01)
(Continued)

(52) U.S. Cl.
CPC ....... *H04N 5/23245* (2013.01); *G06F 1/3203* (2013.01); *G06F 3/017* (2013.01); *G06F 3/0304* (2013.01); *G06F 3/0346* (2013.01); *G06F 3/042* (2013.01); *H04M 1/72519* (2013.01); *H04N 1/00307* (2013.01); *H04N 5/2258* (2013.01);
(Continued)

(58) Field of Classification Search
CPC ............. H04N 5/23245; H04N 5/2258; H04N 5/23241; H04N 5/23293; H04N 1/00307; G06F 3/0304; G06F 3/017; G06F 3/042; G06F 1/3203; G06F 3/0346;
(Continued)

(56) References Cited

U.S. PATENT DOCUMENTS 6,784,928 B1 * 8/2004 Sakurai ................ H04N 3/1562
250/208.1
9,507,429 B1 * 11/2016 Grauer, Jr. .............. G06F 3/017
(Continued)

FOREIGN PATENT DOCUMENTS

JP 2013-118544 A 6/2013
KR 10-2008-0052263 A 6/2008
(Continued)

OTHER PUBLICATIONS

IPhone User Guide for iOs 6.1 Software, 2013; retrieved from https://manuals.info.apple.com/MANUALS/1000/MA1658/en_US/iphone_ios6_user_guide.pdf on Apr. 2, 2016.*

*Primary Examiner* — Timothy J Henn
(74) *Attorney, Agent, or Firm* — Jefferson IP Law, LLP

(57) ABSTRACT

A photographing method of an electronic device and the electronic device thereof are provided. The method includes activating a first camera module and a second camera module, displaying an image captured by the activated first camera module on a screen, and capturing an image of the first camera module displayed on the screen based on information of an image captured by the second camera module photographing. An image captured by the activated first camera module is displayed on a screen. An image of the first camera module displayed on the screen is captured based on information of an image captured by the second camera module.

24 Claims, 10 Drawing Sheets

(51) Int. Cl.
*G06F 3/01* (2006.01)
*G06F 3/03* (2006.01)
*G06F 3/042* (2006.01)
*H04M 1/72* (2006.01)
*H04M 1/00* (2006.01)
*H04N 5/225* (2006.01)
*G06F 3/0346* (2013.01)
*H04M 1/725* (2006.01)
*H04N 1/00* (2006.01)
*H04M 1/02* (2006.01)

(52) U.S. Cl.
CPC ..... *H04N 5/23241* (2013.01); *H04N 5/23293* (2013.01); *G06F 2203/04108* (2013.01); *H04M 1/0264* (2013.01); *H04M 2250/52* (2013.01)

(58) Field of Classification Search
CPC .... G06F 2203/04108; H04M 1/72519; H04M 2250/52; H04M 1/0264
See application file for complete search history.

(56) References Cited

U.S. PATENT DOCUMENTS

| | | | |
|---|---|---|---|
| 9,635,267 B2* | 4/2017 | Lee | H04N 5/23293 |
| 2008/0004073 A1 | 1/2008 | John et al. | |
| 2008/0136940 A1 | 6/2008 | Srikanth et al. | |
| 2010/0020221 A1* | 1/2010 | Tupman | G06F 3/04883 348/333.01 |
| 2010/0048241 A1* | 2/2010 | Seguin | H04M 1/72519 455/556.1 |
| 2011/0216209 A1 | 9/2011 | Fredlund et al. | |
| 2012/0057039 A1 | 3/2012 | Gardiner et al. | |
| 2013/0022346 A1* | 1/2013 | Chen | H04N 5/232 396/502 |
| 2013/0057713 A1 | 3/2013 | Khawand | |
| 2013/0128091 A1 | 5/2013 | Son et al. | |
| 2013/0258136 A1 | 10/2013 | Lee | |
| 2013/0285906 A1 | 10/2013 | Jeon et al. | |
| 2014/0267889 A1* | 9/2014 | McGowan | H04N 5/232 348/373 |
| 2014/0293079 A1* | 10/2014 | Milanfar | H04N 5/2171 348/222.1 |
| 2014/0307101 A1* | 10/2014 | Cobb | H04N 5/45 348/169 |
| 2014/0361986 A1* | 12/2014 | Won | H04N 1/00307 345/156 |
| 2015/0092066 A1* | 4/2015 | Geiss | H04N 5/2258 348/180 |
| 2015/0156432 A1* | 6/2015 | Tozawa | H04N 5/3698 348/302 |
| 2015/0312486 A1* | 10/2015 | Song | H04N 5/2258 348/262 |

FOREIGN PATENT DOCUMENTS

| | | |
|---|---|---|
| KR | 10-2012-0118369 A | 10/2012 |
| KR | 10-2013-0051319 A | 5/2013 |
| KR | 10-2013-0054576 A | 5/2013 |
| KR | 10-2013-0109588 A | 10/2013 |

* cited by examiner

PHOTOGRAPHING METHOD OF AN ELECTRONIC DEVICE AND THE ELECTRONIC DEVICE THEREOF

CROSS-REFERENCE TO RELATED APPLICATION(S)

This application claims the benefit under 35 U.S.C. § 119(a) of a Korean patent application filed on Feb. 11, 2014 in the Korean Intellectual Property Office and assigned Serial number 10-2014-0015389, the entire disclosure of which is hereby incorporated by reference.

TECHNICAL FIELD

The present disclosure relates to a photographing method of an electronic device and an electronic device thereof. More particularly, the present disclosure relates to a photographing method of an electronic device and an electronic device thereof, for automatically capturing an image of a front camera when a user intentionally hides a rear camera while performing self-camera photographing.

BACKGROUND

Various types of electronic devices, such as a smartphone, a tablet personal computer (PC), and the like, may include a digital camera, and the like. For example, the electronic device may include a front camera, which is a first camera, for photographing a front direction, and a rear camera, which is a second camera, for photographing a rear direction based on a display screen of a touchscreen. The front camera is mainly used for a self-camera photographing mode during which a user photographs the user's face, and the like, while viewing the display screen. The rear camera is mainly used for a general camera photographing mode during which a user photographs a different person's face or a surrounding landscape, and the like.

In the self-camera photographing mode, an image of the front camera may be displayed on the display screen. In the general camera photographing mode, an image of the rear camera may be displayed on the display screen. Various types of icons, such as a camera shutter, and the like, that may be selected and used by a user may be displayed on a portion of the display screen. When an icon of the camera shutter displayed on a portion of the display screen is touched by a user, the electronic device may capture an image of the front camera or capture an image of the rear camera displayed at the touch point, and store the same as one image file (e.g., .jpg).

Therefore, a need exists for a photographing method of an electronic device and an electronic device thereof, for automatically capturing an image of a front camera when a user intentionally hides a rear camera while performing self-camera photographing.

The above information is presented as background information only to assist with an understanding of the present disclosure. No determination has been made, and no assertion is made, as to whether any of the above might be applicable as prior art with regard to the present disclosure.

SUMMARY

However, in the case where a user stretches long his arm of a hand gripping a smartphone and a photographing distance becomes long during the self-camera photographing mode, it is difficult for the user to touch the icon of the camera shutter displayed on a portion of the display screen.

Aspects of the present disclosure are to address at least the above-mentioned problems and/or disadvantages and to provide at least the advantages described below. Accordingly, an aspect of the present disclosure is to provide a photographing method of an electronic device and an electronic device thereof, for automatically capturing an image of a front camera when a user intentionally hides a rear camera using his finger, and the like, while performing self-camera photographing in various types of electronic devices, such as a smartphone or a tablet personal computer (PC), and the like.

In accordance with an aspect of the present disclosure, a method for controlling camera photographing in an apparatus that uses a multi-camera module is provided. The method includes activating a first camera module and a second camera module, displaying an image captured by the activated first camera module on a screen, and capturing an image of the first camera module displayed on the screen based on information of an image captured by the second camera module.

In accordance with another aspect of the present disclosure, an electronic device is provided. The electronic device includes a display module, a first image photographing module, a second image photographing module, and a processor configured to execute the first image photographing module and the second image photographing module to display an image of the first image photographing module when a self-camera mode is set, and to capture the image of the first image photographing module based on information of an image of the second image photographing module.

In accordance with another aspect of the present disclosure, a non-transitory computer-readable recordable medium on which a computer program for executing a method is recorded is provided. The method includes activating a first camera module and a second camera module, displaying an image captured by the activated first camera module on a screen, and capturing an image of the first camera module displayed on the screen based on information of an image captured by the second camera module.

Other aspects, advantages, and salient features of the disclosure will become apparent to those skilled in the art from the following detailed description, which, taken in conjunction with the annexed drawings, discloses various embodiments of the present disclosure.

Before undertaking the detailed description below, it may be advantageous to set forth definitions of certain words and phrases used throughout this patent document. The terms "include" and "comprise," as well as derivatives thereof, indicate inclusion without limitation. The term "or" is inclusive, indicating and/or. The phrases "associated with" and "associated therewith," as well as derivatives thereof, may indicate to include, be included within, interconnect with, contain, be contained within, connect to or with, couple to or with, be communicable with, cooperate with, interleave, juxtapose, be proximate to, be bound to or with, have, have a property of, or the like. The term "controller" indicates any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout the present disclosure, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numerals are used to depict the same or similar elements, features, and structures.

DETAILED DESCRIPTION

Figure 1:
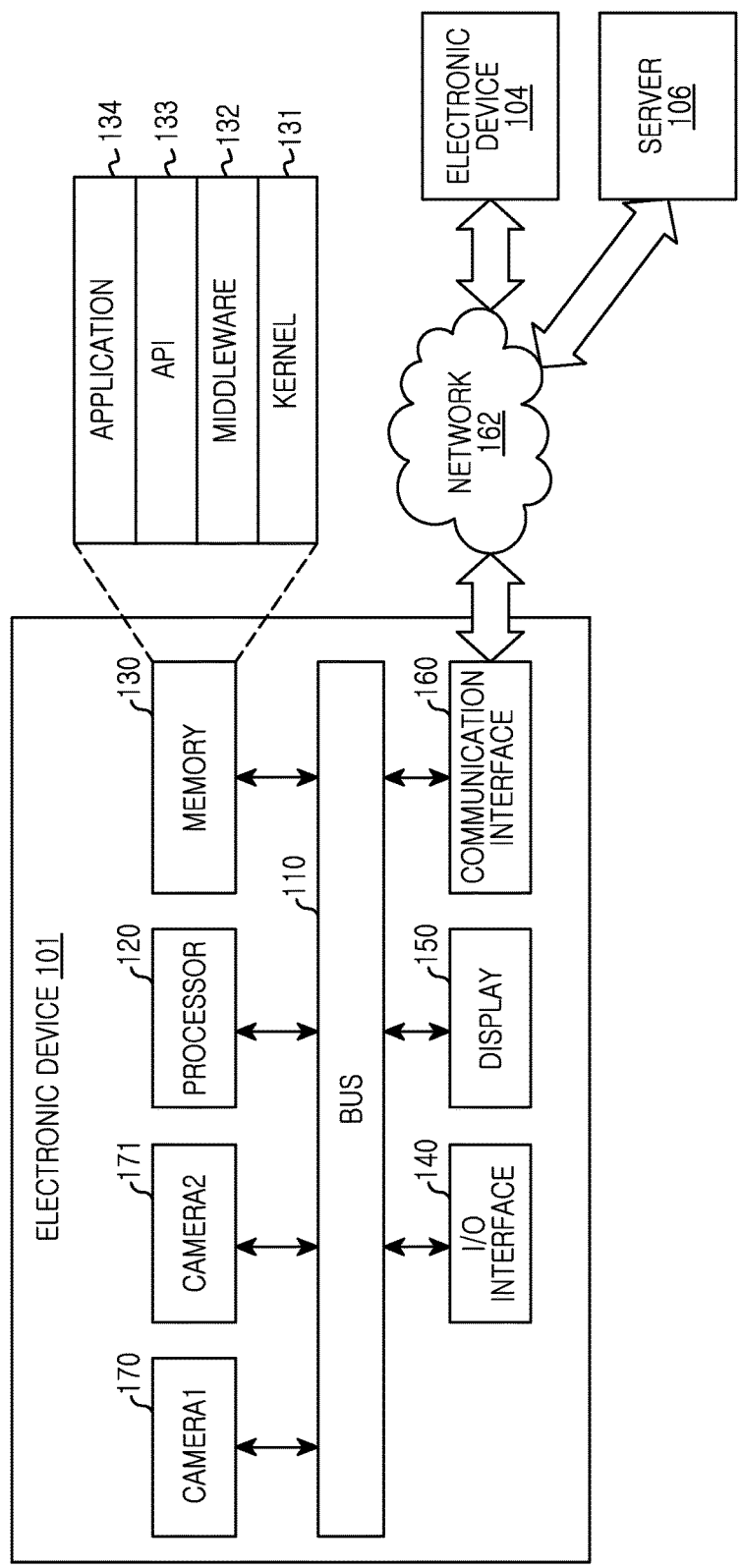
FIG. 1 illustrates a network environment including an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Expressions, such as "include" or "may include", and the like, that may be used for various embodiments of the present disclosure indicate existence of a disclosed relevant function, operation, or element, and the like, and do not limit additional one or more functions, operations, or elements, and the like. In addition, it should be understood that terminologies, such as "include" or "have", and the like, in various embodiments of the present disclosure are intended for designating existence of a characteristic, a number, a step, an operation, an element, a part, or a combination of these described on the specification and do not exclude in advance existence or addition possibility of one or more other characteristics, numbers, steps, operations, elements, parts, or a combination of these.

In the present disclosure, expressions, such as "1st", "2nd", "first" or "second", and the like, may modify various elements of the present disclosure but do not limit relevant elements. For example, the expressions do not limit sequence and/or importance, and the like, of relevant elements. The expressions may be used for discriminating one element from another element. For example, both a first user apparatus and a second user apparatus are all user apparatuses, and represent different user apparatuses. For example, a first element may be named as a second element without departing from the scope of the present disclosure, and similarly, the second element may be named as the first element.

When it is mentioned that a certain element is "connected to" or "accesses" another element, it should be understood that the element may be directly connected to another element or may directly access another element, but still another element may exist in the middle. In contrast, when it is mentioned that a certain element is "directly connected to" or "directly accesses" another element, it should be understood that still another element may not exist in the middle.

An electronic device may be a device including a communication function. For example, an electronic device may include at least one of a smartphone, a tablet personal computer (PC), a mobile phone, a video phone, an e-book reader, a desktop PC, a laptop PC, a netbook computer, a Personal Digital Assistant (PDA), a Portable Multimedia Player (PMP), a Motion Pictures Expert Group (MPEG-1 or MPEG-2) Audio Layer 3 (MP3) player, a mobile medical device, a camera, or a wearable device (e.g., a head-mounted-device (HMD), such as electronic glasses, an electronic clothing, an electronic bracelet, an electronic necklace, an electronic appcessory, an electronic tattoo, a smartwatch, and the like).

According to various embodiments of the present disclosure, an electronic device may be a smart home appliance having a communication function. A smart home appliance may include, for example, at least one of a television (TV), a Digital Video Disk (DVD) player, an audio player, a refrigerator, an air conditioner, a cleaner, an oven, an electronic range, a washing machine, an air purifier, a set-top box, a TV box (for example, Samsung HomeSync™, Apple TV™, or Google TV™), game consoles, an electronic dictionary, an electronic key, a camcorder, or an electronic frame.

According to various embodiments of the present disclosure, an electronic device may include at least one of various medical devices (e.g., Magnetic Resonance Angiography (MRA), Magnetic Resonance Imaging (MRI), Computed Tomography (CT), a photographing device, an ultrasonic device, and the like), a navigation device, a Global Positioning System (GPS) receiver, an event data recorder (EDR), a flight data recorder (FDR), an automobile infotainment device, electronic equipment for a ship (e.g., a navigation device for a ship, a gyro compass, and the like), an avionics, a security device, a head unit for an automobile, a robot for an industrial use or a home use, an automatic teller's machine (ATM) of a financial institution or a point of sales of a store.

According to various embodiments of the present disclosure, an electronic device may include at least one of a furniture or a portion of a building/structure including a communication function, an electronic board, an electronic signature receiving device, a projector, or various measurement devices (e.g., waterworks, electricity, gas, or radio wave measuring device, and the like). An electronic device may be a combination of one or more of the above-described devices. In addition, an electronic device may be a flexible device. In addition, it is obvious to a person of ordinary skill in the art that the electronic device is not limited to the above-described devices.

Hereinafter, an electronic device is described with reference to the accompanying drawings. A terminology of a user used in various embodiments of the present disclosure may indicate a person who uses an electronic device or a device (e.g., an artificial intelligence electronic device) that uses the electronic device.

FIG. 1 illustrates a network environment including an electronic device according to an embodiment of the present disclosure.

Referring to FIG. 1, an electronic device 101 may include a bus 110, a processor 120, a memory 130, an input/output (I/O) interface 140, a display 150, a communication interface 160, a first camera 170, and a second camera 171, and the like. The first camera 170 and the second camera 171 may be variously called a first camera module and a second camera module, or a first image photographing module and a second image photographing module, and the like.

The first camera 170 may be a front camera photographing the front from the display 150, and the second camera 171 may be a rear camera photographing the rear and may cooperate with the processor 120. The bus 210 may be a circuit for connecting the above-described elements with each other, and transferring communication (e.g., a control message) between the above-described elements.

The processor 120 may receive, for example, an instruction from the above-described other elements (e.g., the memory 130, the I/O interface 140, the display 150, the communication interface 160, and the like) via the bus 120, decipher the received instruction, and execute an operation or a data process corresponding to the deciphered instruction.

The memory 130 may store an instruction or data received from the processor 120 or other elements (e.g., the I/O interface 140, the display 150, the communication interface 160, and the like), or generated by the processor 120 or other elements. The memory 130 may include, for example, programming modules, such as a kernel 131, a middleware 132, an application programming interface (API) 133, an application 134, and the like. The each of the programming modules may be configured using a software, a firmware, a hardware, or a combination of two or more of these.

The kernel 131 may control or manage system resources (e.g., the bus 110, the processor 120, or the memory 130, and the like) used for executing an operation or a function implemented in the rest of the programming modules, for example, the middleware 132, the API 133, or the application 134. In addition, the kernel 131 may provide an interface for allowing the middleware 132, the API 133, or the application 134 to access an individual element of the electronic device 101 and control or manage the same.

The middleware 132 may perform a mediation role so that the API 133 or the application 134 may communicate with the kernel 131 to give and take data. In addition, in connection with task requests received from the applications 134, the middleware 132 may perform a control (e.g., scheduling or load balancing) for a task request using, for example, a method of assigning priority that may use a system resource (e.g., the bus 110, the processor 120, or the memory 130, and the like) of the electronic device to at least one of the applications 134.

The API 133 is an interface for allowing the application 134 to control a function provided by the kernel 131 or the middleware 132, and may include at least one interface or function (e.g., an instruction) for file control, window control, image processing, or character control, and the like.

According to various embodiments of the present disclosure, the application 134 may include a short message service (SMS)/multimedia messaging service (MMS) application, an e-mail application, a calendar application, alarm application, a health care application (e.g., an application for measuring quantity of motion or blood sugar, and the like), or an environment information application (e.g., an application providing atmospheric pressure, humidity or temperature information, and the like). Additionally or alternatively, the application 134 may be an application related to information exchange between the electronic device 101 and an external electronic device (e.g., the electronic device 104). The application related to the information exchange may include, for example, a notification relay application for transferring specific information to the external electronic device or a device management application for managing the external electronic device.

For example, the notification relay application may include a function for transferring notification information generated from a different application (e.g., an SMS/MMS application, an e-mail application, a health care application, or an environment information application) of the electronic device 101 to an external electronic device (e.g., the electronic device 104). Additionally or alternatively, the notification relay application may, for example, receive notification information from an external electronic device (e.g., the electronic device 104) and provide the same to a user. The device management application may manage (e.g., install, delete, or update) a function (e.g., turn-on/turn-off of an external electronic device itself (or some constituent part) or luminance (or resolution) control of a display) and an application operating in the external electronic device or a service (e.g., a communication service or a message service) provided by the external electronic device.

According to various embodiments of the present disclosure, the application 134 may include a designated application depending on an attribute (e.g., a kind of an electronic device) of the external electronic device (e.g., the electronic device 104). For example, in the case where the external electronic device is an MP3 player, the application 134 may include an application related to music reproduction. Similarly, in the case where the external electronic device is a mobile medical health care device, the application may include an application related to health care. According to an embodiment of the present disclosure, the application 134 may include at least one of an application designated in the electronic device 101 and an application received from the external electronic device (e.g., the server 106 or the electronic device 104).

The I/O interface 140 may transfer an instruction or data input from a user via an I/O unit (e.g., a sensor, a keyboard, or a touchscreen) to the processor 120, the memory 130, and the communication interface 160 via the bus 110, for example. For example, the I/O interface 140 may provide data regarding a user's touch input via the touchscreen to the processor 120. In addition, the I/O interface 140 may, for example, output an instruction or data received via the bus 110 from the processor 120, the memory 130, and the communication interface 160 via the I/O unit (e.g., a speaker or a display). For example, the I/O interface 140 may output voice data processed by the processor 120 to a user via a speaker.

The display 150 may display various information (e.g., multimedia data or text data, and the like) to a user. The communication interface 160 may connect communication between the electronic device 101 with an external device (e.g., the electronic device 104 or the server 106). For example, the communication interface 160 may be connected with a network 162 via wireless communication or wired communication to communicate with the external device. The wireless communication may, for example, include at least one of Wireless Fidelity (Wi-Fi), Bluetooth (BT), Near Field Communication (NFC), GPS, or cellular communication (e.g., Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), or Global System for Mobile Communications (GSM), and the like). The wired communication may include at least one of Universal Serial Bus (USB), High Definition Multimedia Interface (HDMI), recommended standard 232 (RS-232), and plain old telephone service (POTS).

According to an embodiment of the present disclosure, the network 162 may be a telecommunications network. The telecommunications network may include at least one of a computer network, the Internet, an Internet of things, and a telephone network. According to an embodiment of the present disclosure, a protocol (e.g., a transport layer protocol, a data link layer protocol, or a physical layer protocol) for communication between the electronic device 101 and an external device may be supported by at least one of the application 134, the application programming interface 133, the middleware 132, the kernel 131, or the communication interface 160.

Figure 2:
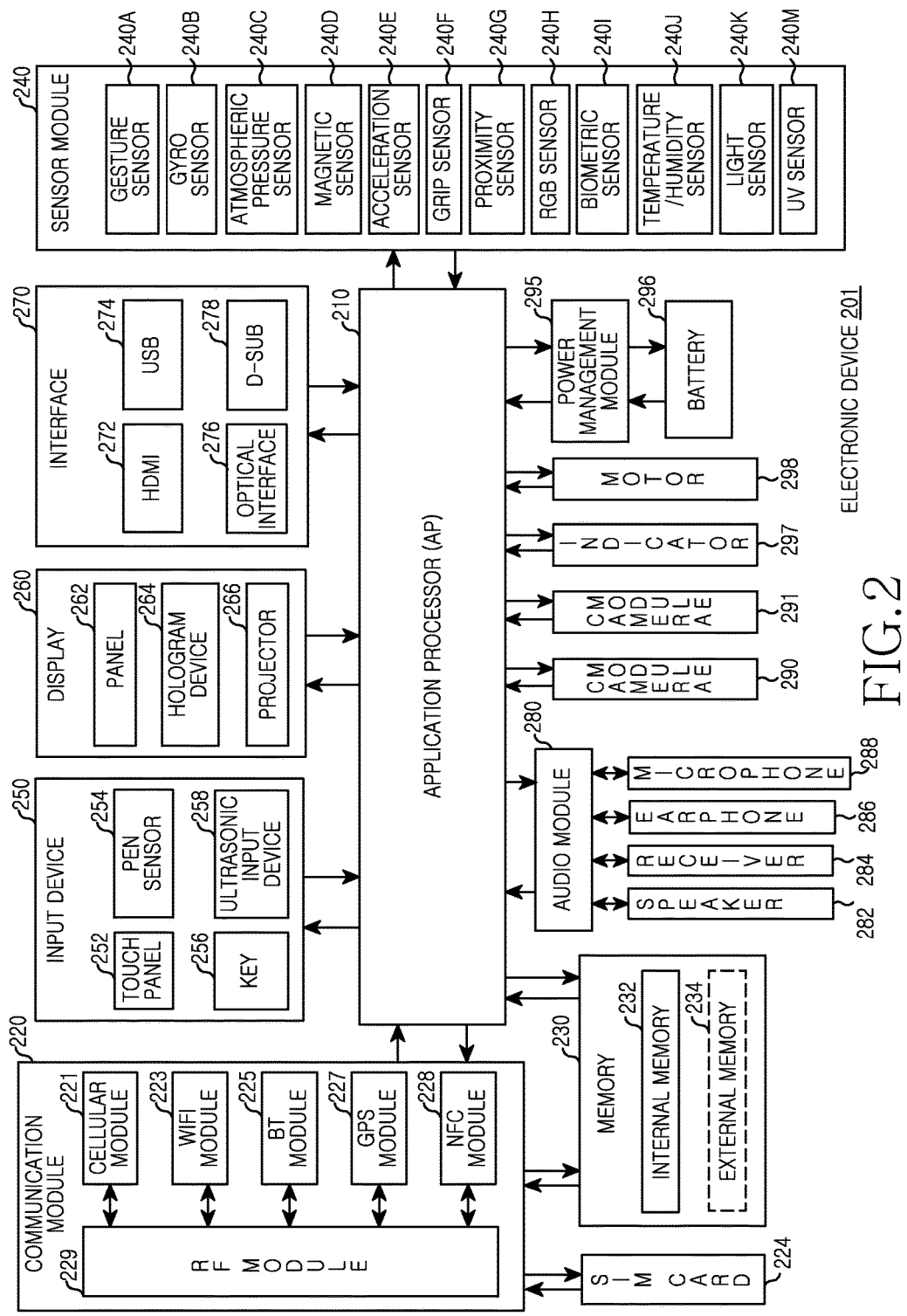
FIG. 2 is a block diagram illustrating an electronic device according to an embodiment of the present disclosure.

FIG. 2 is a block diagram illustrating an electronic device according to an embodiment of the present disclosure. An electronic device may, for example, configure all or a portion of the electronic device 101 illustrated in FIG. 1.

Referring to FIG. 2, an electronic device 201 may include one or more application processors (APs) 210, a communication module 220, a Subscriber Identification Module (SIM) card 224, a memory 230, a sensor module 240, an input unit 250, a display 260, an interface 270, an audio module 280, a first camera module 290, a second camera module 291, a power management module 295, a battery 296, an indicator 297, and a motor 298.

The AP 210 may drive an Operating System (OS) or an application to control a plurality of hardware or software elements connected to the AP 210, and perform various data processings including multimedia data and an operation. The AP 210 may be, for example, implemented as a System on Chip (SoC). According to an embodiment of the present disclosure, the AP 210 may further include a Graphic Processing Unit (GPU) (not shown).

The communication module 220 (e.g., the communication interface 160) may perform data transmission/reception in communication between the electronic device 201 (e.g., the electronic device 101) and other electronic devices (e.g., the electronic device 104 or the server 106) connected via a network. According to an embodiment of the present disclosure, the communication module 220 may include a cellular module 221, a Wi-Fi module 223, a BT module 225, a GPS module 227, an NFC module 228, and a Radio Frequency (RF) module 229.

The cellular module 221 may provide voice communication, image communication, a short message service, or an Internet service, and the like, via a communication network (e.g., LTE, LTE-A, CDMA, WCDMA, UMTS, WiBro, or GSM, and the like). In addition, the cellular module 221 may perform discrimination and authentication of an electronic device within a communication network using, for example, a subscriber identification module (e.g., a SIM card 224). According to an embodiment of the present disclosure, the cellular module 221 may perform at least a portion of functions that may be provided by the AP 210. For example, the cellular module 221 may perform at least a portion of a multimedia control function.

According to an embodiment of the present disclosure, the cellular module 221 may include a communication processor (CP). In addition, the cellular module 221 may be, for example, implemented as an SoC. Though elements, such as the cellular module 221 (e.g., a communication processor), the memory 230, the power management module 295, and the like, are illustrated as elements separated from the AP 210 in FIG. 2, the AP 210 may be implemented to include at least a portion (e.g., the cellular module 221) of the above-described elements.

According to an embodiment of the present disclosure, the AP 210 or the cellular module 221 (e.g., a communication processor) may load an instruction or data received from at least one of a non-volatile memory and other elements connected thereto onto a volatile memory, and process the same. In addition, the AP 210 or the cellular module 221 may store data received from at least one of other elements or generated by at least one of other elements in a non-volatile memory.

Each of the Wi-Fi module 223, the BT module 225, the GPS module 327, or the NFC module 228 may include, for example, a processor for processing data transmitted/received via a relevant module. Though the cellular module 221, the Wi-Fi module 223, the BT module 225, the GPS module 327, or the NFC module 228 are illustrated as separate blocks in FIG. 2, at least a portion (e.g., two or more elements) of the cellular module 221, the Wi-Fi module 223, the BT module 225, the GPS module 327, or the NFC module 228 may be included in one Integrated Circuit (IC) or an IC package. For example, at least a portion (e.g., a communication processor corresponding to the cellular module 221 and a Wi-Fi processor corresponding to the Wi-Fi module 223) of processors corresponding to each of the cellular module 221, the Wi-Fi module 223, the BT module 225, the GPS module 327, or the NFC module 228 may be implemented as one SoC.

The RF module 229 may perform transmission/reception of data, for example, transmission/reception of an RF signal. The RF module 229 may include, for example, a transceiver, a power amp module (PAM), a frequency filter, or a low noise amplifier (LNA), and the like, though not shown. In addition, the RF module 229 may further include a part for transmitting/receiving an electromagnetic wave on a free space in wireless communication, for example, a conductor or a conducting line, and the like. Though FIG. 2 illustrates the cellular module 221, the Wi-Fi module 223, the BT module 225, the GPS module 327, and the NFC module 228 share one RF module 229, at least one of the cellular module 221, the Wi-Fi module 223, the BT module 225, the GPS module 327, or the NFC module 228 may perform transmission/reception of an RF signal via a separate RF module.

The SIM card 224 may be a card including a subscriber identification module, and may be inserted into a slot formed in a specific position of the electronic device. The SIM card 224 may include unique identify information (e.g., integrated circuit card identifier (ICCID)) or subscriber information (e.g., international mobile subscriber identity (IMSI)).

The memory 230 (e.g., the memory 130) may include a built-in memory 232 or an external memory 234. The built-in memory 232 may include, for example, at least one of a volatile memory (e.g., dynamic Random Access Memory (DRAM), static RAM (SRAM), synchronous dynamic RAM (SDRAM)) and a non-volatile memory (e.g., one time programmable Read Only Memory (OTPROM), programmable ROM (PROM), erasable and programmable ROM (EPROM), electrically erasable and programmable ROM (EEPROM), mask ROM, flash ROM, Not And (NAND) flash memory, Not Or (NOR) flash memory, and the like).

According to an embodiment of the present disclosure, the built-in memory 232 may be a Solid State Drive (SSD). The external memory 234 may further include a flash drive, for example, compact flash (CF), secure digital (SD), micro secure digital (Micro-SD), mini secure digital (Mini-SD), extreme digital (xD), or a memory stick. The external memory 234 may be functionally connected with the electronic device 201 via various interfaces. According to an embodiment of the present disclosure, the electronic device 201 may further include a storage device (or a storage medium), such as a hard drive.

The sensor module 240 may measure a physical quantity or detect an operation state of the electronic device 201, and convert the measured or detected information to an electric signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., red, green, blue (RGB) sensor), a living body sensor 240I, a temperature/humidity sensor 240J, an illuminance sensor 240K, or an ultra violet (UV) sensor 240M. Additionally or alternatively, the sensor module 240 may include, for example, an E-nose sensor (not shown), an electromyography (EMG) sensor (not shown), an electroencephalogram (EEG) sensor (not shown), an electrocardiogram (ECG) sensor (not shown), an infrared (IR) sensor (not shown), an iris sensor (not shown), or a fingerprint sensor (not shown), and the like. The sensor module 240 may further include a control circuit for controlling at least one sensor belonging thereto.

The input unit 250 may include a touch panel 252, a (digital) pen sensor 254, a key 256, or an ultrasonic input unit 258. The touch panel 252 may detect a touch input using at least one of capacitive, resistive, infrared, or ultrasonic methods. In addition, the touch panel 252 may further include a control circuit. A capacitive touch panel may perform detection by a physical contact or proximity detection. The touch panel 252 may further include a tactile layer. In this case, the touch panel 252 may provide a tactile reaction to a user.

The (digital) pen sensor 254 may be implemented using, for example, a method which is the same as or similar to receiving a user's touch input, or using a separate sheet for detection. The key 256 may include, for example, a physical button, an optical key or keypad. The ultrasonic input unit 258 is a unit for recognizing data by detecting a sound wave using a microphone (e.g., a microphone 288) in the electronic device 201 via an input tool generating an ultrasonic signal, and enables wireless detection. According to an embodiment of the present disclosure, the electronic device 201 may receive a user input from an external device (e.g., a computer or a server) connected to the communication module 220 using the communication module 220.

The display 260 (e.g., the display 150) may include a panel 262, a hologram device 264, or a projector 266. The panel 262 may be, for example, a liquid crystal display (LCD), or an active-matrix organic light-emitting diode (AM-OLED), and the like. The panel 262 may be implemented, for example, such that it is flexible, transparent, or wearable. The panel 262 may be configured as one module together with the touch panel 252. The hologram device 264 may show a three-dimensional image in the air using interferences of light. The projector 266 may project light onto a screen to display an image. The screen may be positioned, for example, inside or outside the electronic device 201. According to an embodiment of the present disclosure, the display 260 may further include a control circuit for controlling the panel 262, the hologram device 264, or the projector 266.

The interface 270 may include, for example, an HDMI 272, a USB 274, an optical interface 276, or a D-subminiature (D-sub) 278. The interface 270 may be included, for example, in the communication interface 160 illustrated in FIG. 1. Additionally or alternatively, the interface 270 may include a mobile high-definition link (MHL) interface, an SD card/multi-media card (MMC) interface, or an infrared data association (IrDA) standard interface.

The audio module 280 may convert a sound and an electric signal in dual directions. At least a partial element of the audio module 280 may be included, for example, in the I/O interface 140 illustrated in FIG. 1. The audio module 280 may process sound information input or output via, for example, a speaker 282, a receiver 284, an earphone 286, or a microphone 288, and the like.

The first camera module 290 and the second camera module 291 are devices that may photograph a still image and a moving picture, and may be manufactured as one module. According to an embodiment of the present disclosure, the first camera module 290 and the second camera module 291 may include one or more image sensors (e.g., a front sensor or a rear sensor), a lens (not shown), an image signal processor (ISP) (not shown), or a flash (not shown) (e.g., an LED or xenon lamp). The power management module 295 may manage power of the electronic device 201. Though not shown, the power management module 295 may include, for example, a power management integrated circuit (PMIC), a charger integrated circuit (IC), or a battery or a battery or fuel gauge.

The PMIC may be mounted, for example, inside an integrated circuit or an SoC semiconductor. A charging method may be classified into a wired charging method and a wireless charging method. The charging IC may charge a battery and prevent introduction of an overvoltage or an overcurrent from a charger. According to an embodiment of the present disclosure, the charging IC may include a charging IC for at least one of the wired charging method and the wireless charging method. The wireless charging method may be, for example, a magnetic resonance method, a magnetic induction method, or an electromagnetic wave method, and the like, and may additionally include an additional circuit for wireless charging, for example, a circuit, such as a coil loop, a resonance circuit, or a rectifier, and the like.

The battery gauge may measure, for example, a remnant of the battery 296, a voltage, a current, or a temperature while charging. The battery 296 may store or generate electricity, and supply power to the electronic device 201 using the stored or generated electricity. The battery 296 may include, for example, a rechargeable battery or a solar battery.

The indicator 297 may display a specific state of the electronic device 201 or a portion thereof (e.g., the AP 310), for example, a booting state, a message state, or a charging state, and the like. The motor 298 may convert an electric signal to mechanical vibration. Though not shown, the electronic device 201 may include a processor (e.g., a GPU) for supporting a mobile TV. The processor for supporting the mobile TV may process media data corresponding to standards, for example, such as digital multimedia broadcasting (DMB), digital video broadcasting (DVB), a media flow, and the like.

Each of the above-described elements of the electronic device may be configured using one or more components, and a name of a relevant element may change depending on a kind of the electronic device. An electronic device may include at least one of the above-described elements, and a portion of the elements may be omitted, or additional other elements may be further included. In addition, a portion of the elements of the electronic device may combine to form one entity and equally perform a function of the relevant elements before the combination.

Hereinafter, a photographing method of an electronic device and an electronic device thereof are described below. An electronic device may be an electronic device, such as a smartphone, a tablet PC, and the like, and may include the elements illustrated in FIGS. 1 and 2. In a smartphone which is one of electronic devices to which various embodiments of the present disclosure are applied, for example, referring to FIG. 3, a first camera which is a first image photographing module may be installed as a front camera 300 on a front side, and a second camera which is a second image photographing module may be installed as a rear camera 310 on a backside. The first camera and the second camera may be variously called a first camera module and a second camera module, and the like.

Figure 3:
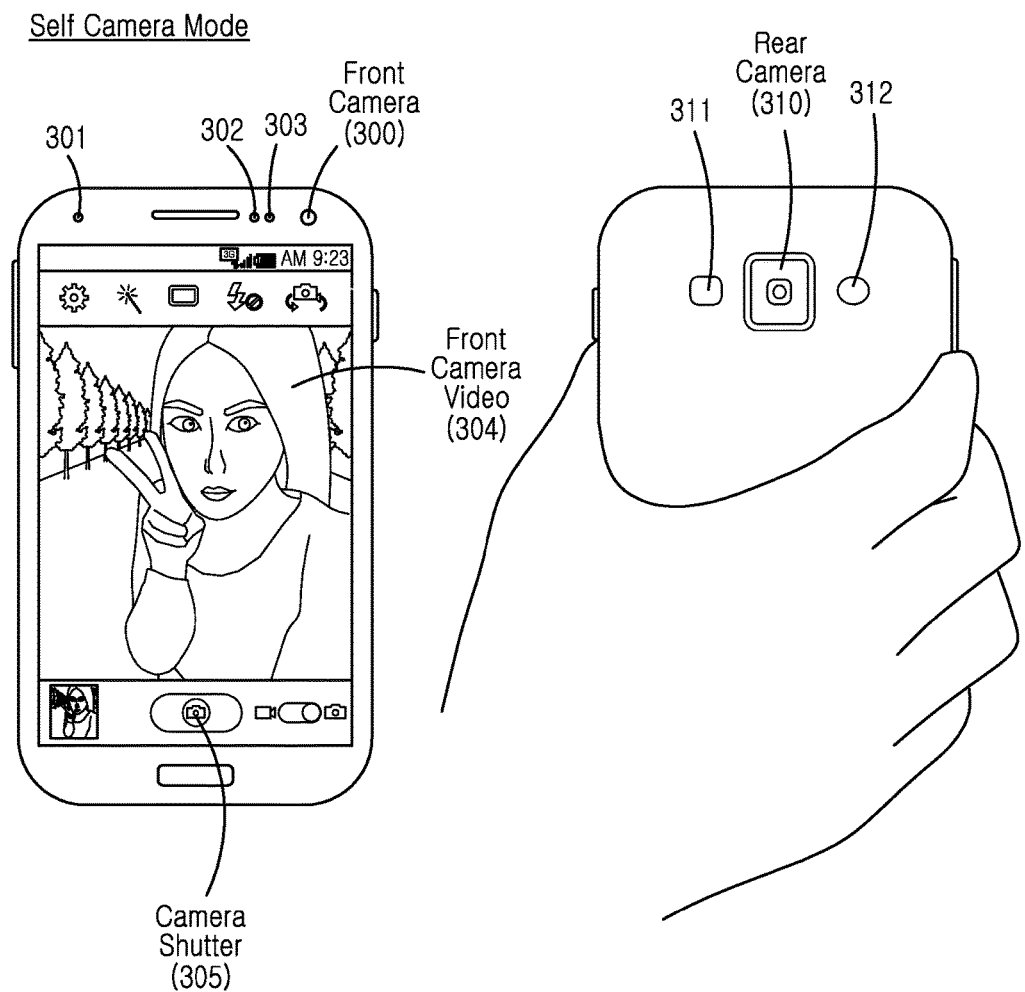
FIG. 3 illustrates a front camera and a rear camera installed to an electronic device according to an embodiment of the present disclosure.

FIG. 3 illustrates a front camera and a rear camera installed to an electronic device according to an embodiment of the present disclosure.

Referring to FIG. 3, the front camera 300 is mainly used for a self-camera photographing mode during which a user photographs the user's face while viewing the user's face, and the like, and the rear camera 310 is mainly used for a general camera photographing mode during which a user photographs a different person's face or a surrounding landscape, and the like. For example, referring to FIG. 3, an LED 301, an illuminance sensor 302, and a proximity sensor 303, and the like, may be installed on the front side of a smartphone to which the front camera 300 is installed, and a light 311 and a speaker 312, and the like, may be installed on the backside to which the rear camera 310 is installed.

During the self-camera photographing mode, an image 304 of the front camera may be displayed as a main image on a display screen, and icons, such as a camera shutter 305, and the like, that may be selected by a user may be displayed on a portion of the display screen. For example, referring to FIG. 3, a user may stretch long his arm of a hand gripping a smartphone and increase a photographing distance between the front camera 300 and the user's face during the self-camera photographing mode. Here, the rear camera 310 installed on the backside of the smartphone may not be hidden by the user's hand.

Figure 4:
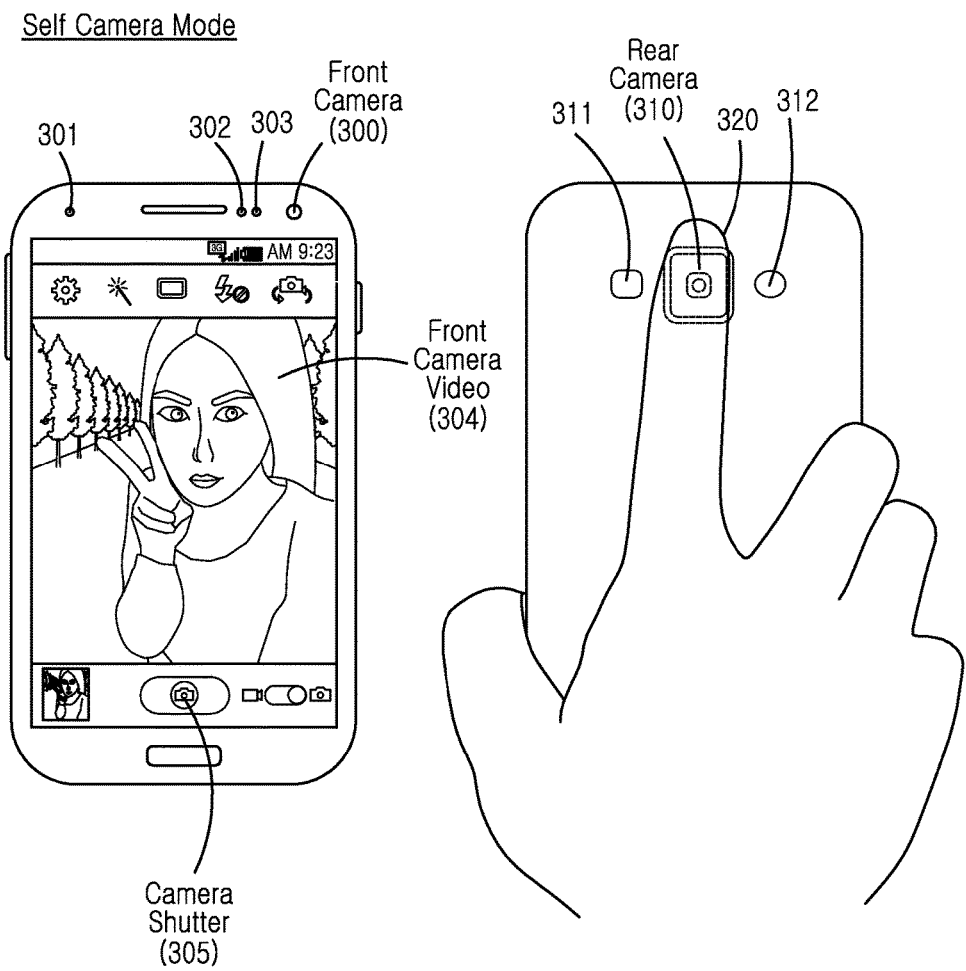
FIG. 4 illustrates a rear camera of an electronic device being hidden by a user according to an embodiment of the present disclosure.

FIG. 4 illustrates a rear camera of an electronic device being hidden by a user according to an embodiment of the present disclosure.

Referring to FIG. 4, in another electronic device, for example, referring to FIG. 4, when a user intentionally hides the rear camera 310 using his finger 320, and the like, during the self-camera photographing mode, the electronic device automatically captures an image 304 of the front camera, so that the user does not need to inconveniently touch the icon of the camera shutter displayed on a portion of the display screen, convenience improves and the user may perform a self-camera photographing operation at a stable posture.

Figure 5:
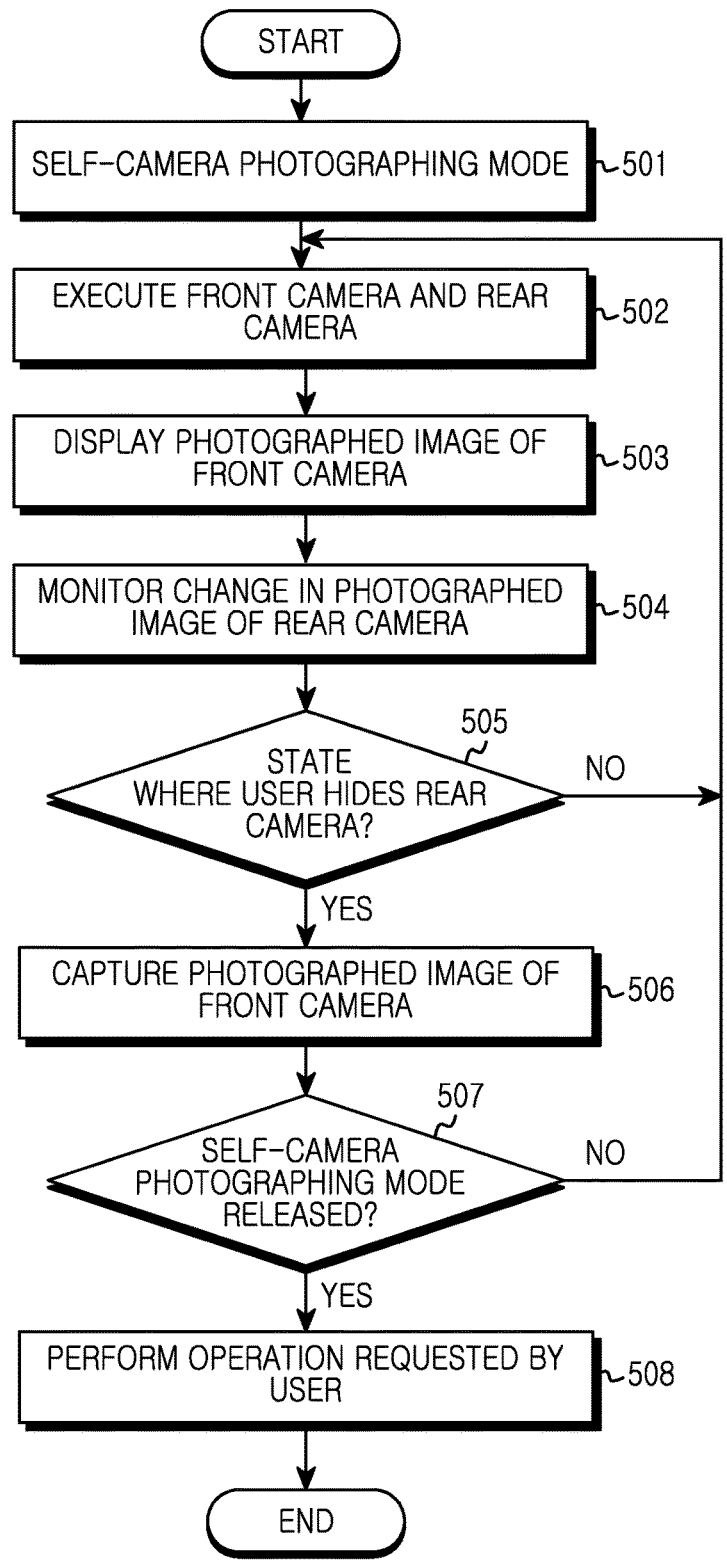
FIG. 5 is a flowchart illustrating a photographing method of an electronic device according to an embodiment of the present disclosure.

FIG. 5 is a flowchart illustrating a photographing method of an electronic device according to an embodiment of the present disclosure.

Referring to FIG. 5, the processor 120 sets a self-camera photographing mode depending on a user's request, and the like, in operation 501. When the self-camera photographing mode is set, the processor 120 executes a front camera 300 for a self-camera photographing operation, and executes a rear camera 310 in order to perform a camera shutter function while performing the self-camera photographing operation in operation 502.

The processor 120 displays an image shot by the front camera 300 as a main image on a display screen in operation 503. The processor 120 monitors a change of an image shot by the rear camera 310 in operation 504. The processor 120 determines whether the electronic device is in a hidden state where a user hides the rear camera 310 using his finger, and the like, based on an image change of the rear camera 310 in operation 505. When the electronic device is in the hidden state as a result of the determination, the processor 120 automatically captures an image of the front camera 300 in operation 506. In operation 507, the processor 120 determines whether the self-camera photographing mode is released. When the electronic device releases the self-camera photographing mode depending on a user's request, and the like, in operation 507, the processor 120 performs an operation requested by the user afterward in operation 508.

When the electronic device sets the self-camera photographing mode depending on a user's request, and the like, as described above, the processor 120 not only executes the front camera 300 but also executes the rear camera 310 in order to perform a camera shutter function. The front camera 300 performs photographing at maximum resolution of the front camera 300, and the rear camera 310 performs photographing at resolution lower than maximum resolution of the rear camera 310, for example, at minimum resolution.

This is for preventing much power consumption from being generated by the rear camera 310 used for the camera shutter function during the self-camera photographing mode. For example, the processor 120 executes the rear camera 310 during the self-camera photographing mode and prevents image processing of high resolution that generates much power consumption from being executed unnecessarily, thereby efficiently reducing power consumption.

Figure 6A:
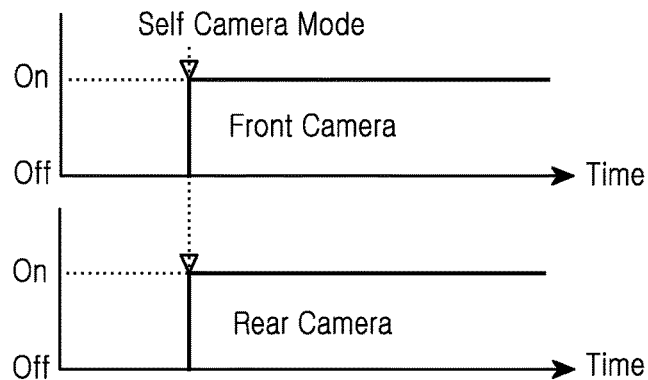
FIGS. 6A, 6B, and 6C are timing views illustrating a front camera and a rear camera being executed according to various embodiments of the present disclosure.
Figure 6B:
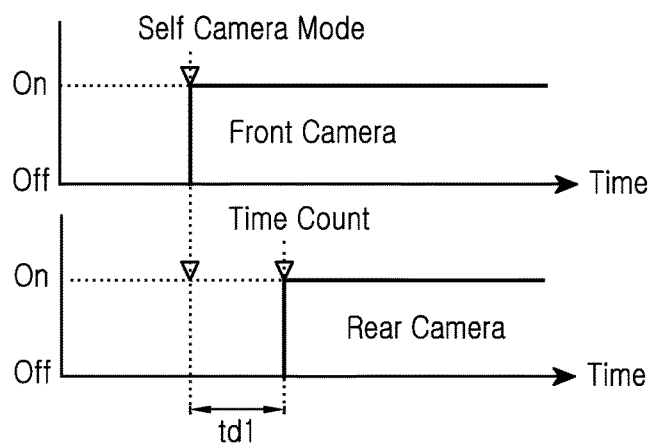
Figure 6C:
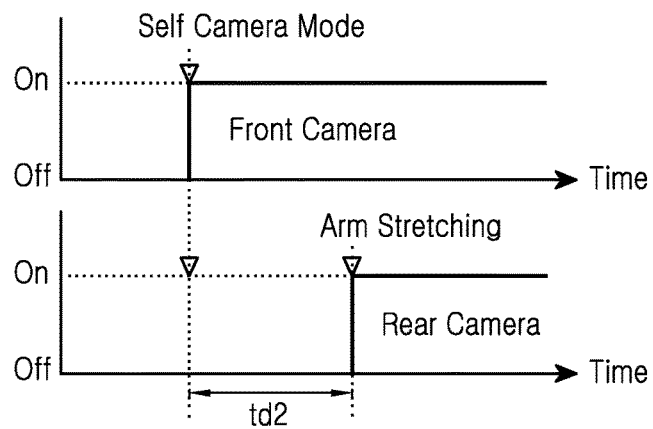

FIGS. 6A, 6B, and 6C are timing views illustrating a front camera and a rear camera being executed according to various embodiments of the present disclosure.

Referring to FIG. 6A, when the self-camera photographing mode is set, the processor 120 may execute the front camera 300 and the rear camera 310 simultaneously.

Alternatively, referring to FIG. 6B, the processor 120 may execute the front camera 300, and when the front camera 300 is executed continuously for a reference time dt set in advance, the processor 120 may execute the rear camera 310.

For example, since a time interval of at least 1 second is taken from a point at which a user starts self-camera photographing to a point at which the user hides the rear camera 310 with his finger, and the like, the processor 120 may execute activation of the front camera 300, and then execute activation of the rear camera 310 at a point where a reference time (e.g., dt1=5 seconds) set in advance elapses. This is for efficiently reducing power consumption generated by execution of the rear camera 310.

Referring to FIG. 6C, the processor 120 may execute the front camera 300, and then execute the rear camera 310 at a point (e.g., dt2=arbitrary time) where a separation distance between the front camera 300 and a photographed object (e.g., a user's face, and the like) becomes greater than a reference distance. For example, when a user stretches long his arm of a hand gripping a smartphone to increase a separation distance between the front camera 300 and a photographed object, the processor 120 may execute the rear camera 310.

Figure 7A:
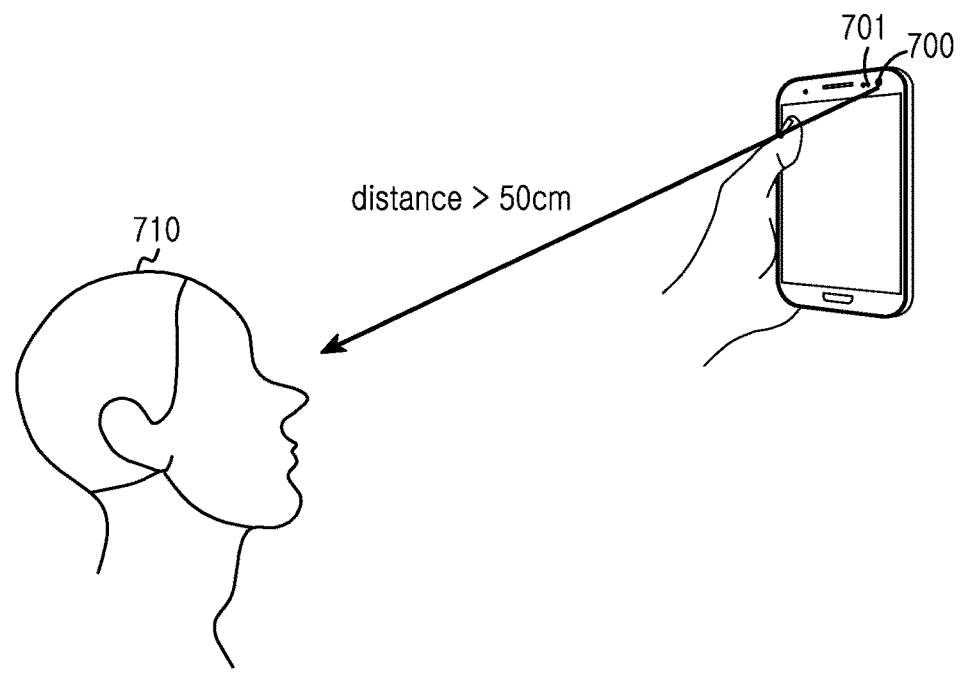
FIGS. 7A and 7B illustrate a separation distance between an electronic device and a user changes according to an embodiment of the present disclosure.
Figure 7B:
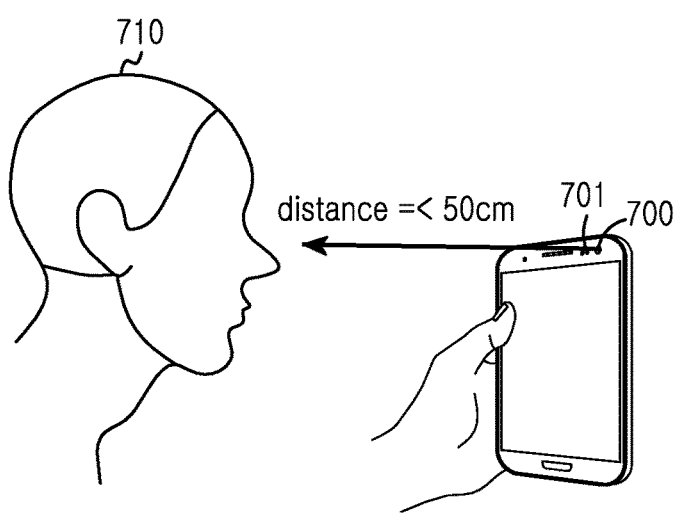

FIGS. 7A and 7B illustrate a separation distance between an electronic device and a user changes according to various embodiments of the present disclosure.

The separation distance or whether the separation distance becomes greater than a reference distance may be obtained by a gesture sensor, a gyro sensor, an acceleration sensor, and a proximity sensor, and the like.

For example, referring to FIG. 7A, when a separation distance up to a photographed object 710 detected by a proximity sensor 701 (e.g., an infrared sensor) installed on the front side of the smartphone together with the front camera 700 exceeds a reference distance (e.g., distance=50 cm) set in advance, the processor 120 executes the rear camera 310.

Referring to FIG. 7B, when the separation distance does not exceed the reference distance, the processor 120 may not execute the rear camera 310.

For example, since it is difficult for a user to touch an icon of a camera shutter displayed on a portion of the display screen when the user views the display screen at a long distance (e.g., distance>50 cm), the processor 120 executes the rear camera 310 in order to perform a camera shutter function. In contrast, since it is easy for a user to touch the icon of the camera shutter displayed on a portion of the display screen when the user views the display screen at a close distance (e.g., distance=<50 cm), the processor 120 does not execute the rear camera 310 for performing the camera shutter function. This is for efficiently reducing power consumption generated by execution of the rear camera 310 during the self-camera photographing mode.

Figures 8A, 8B:
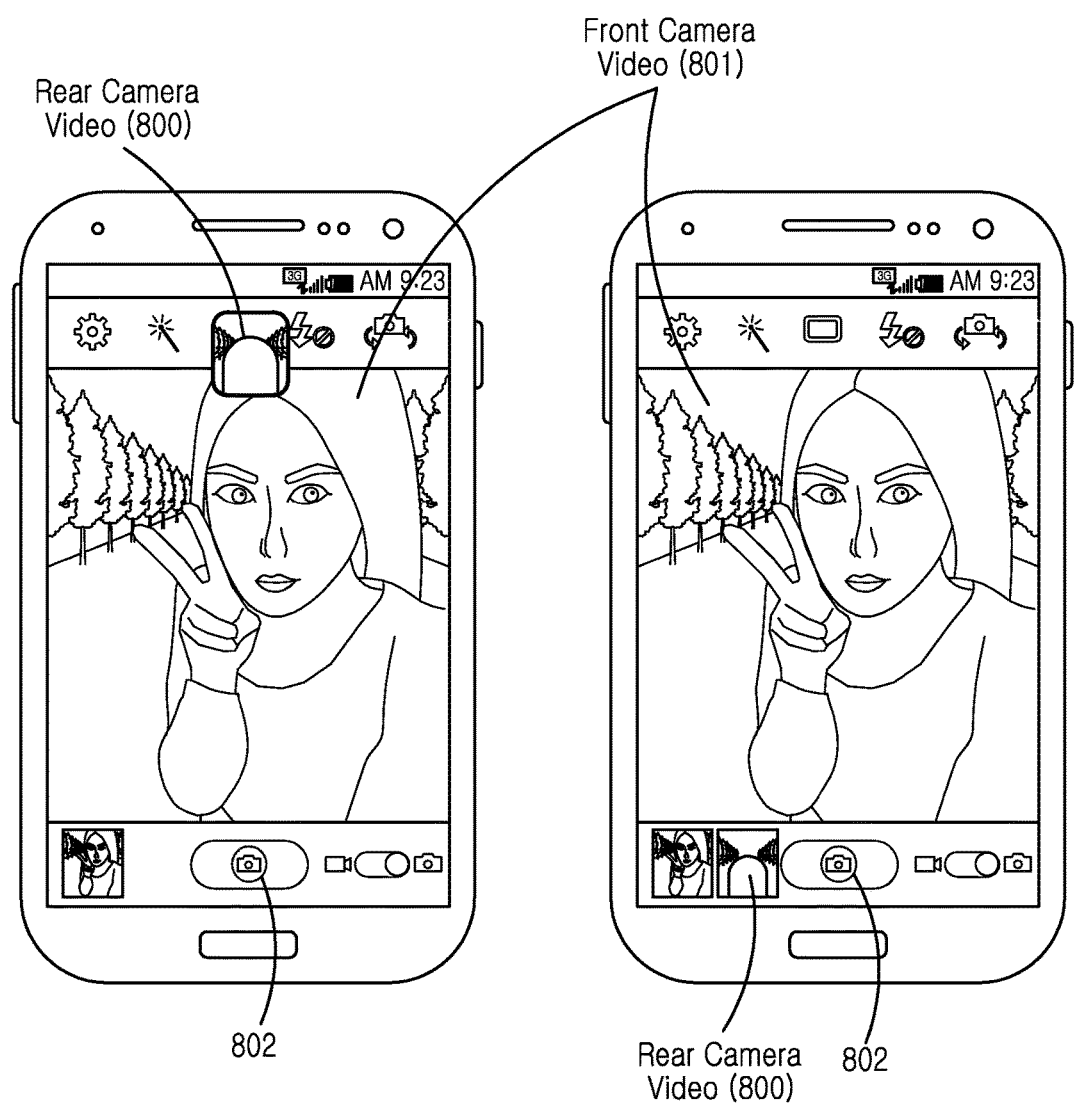
FIGS. 8A and 8B illustrate an image of a rear camera being displayed as a sub-image according to an embodiment of the present disclosure.

FIGS. 8A and 8B illustrate an image of a rear camera being displayed as a sub-image according to various embodiments of the present disclosure.

The processor 120 may display an image of the front camera as a main image on a display screen, and display an image of the rear camera as a sub-image of a small size.

For example, referring to FIG. 8A, an image 800 of the rear camera may overlap in a small size inside an image 801 of the front camera displayed as the main image.

Alternatively, referring to FIG. 8B, the image 800 of the rear camera may be displayed in a small size inside a region where an icon, such as a camera shutter 802, and the like, is displayed. This is for allowing a user to accurately hide the rear camera with his finger, and the like, while viewing the image 800 of the rear camera as the sub-image.

Figure 9:
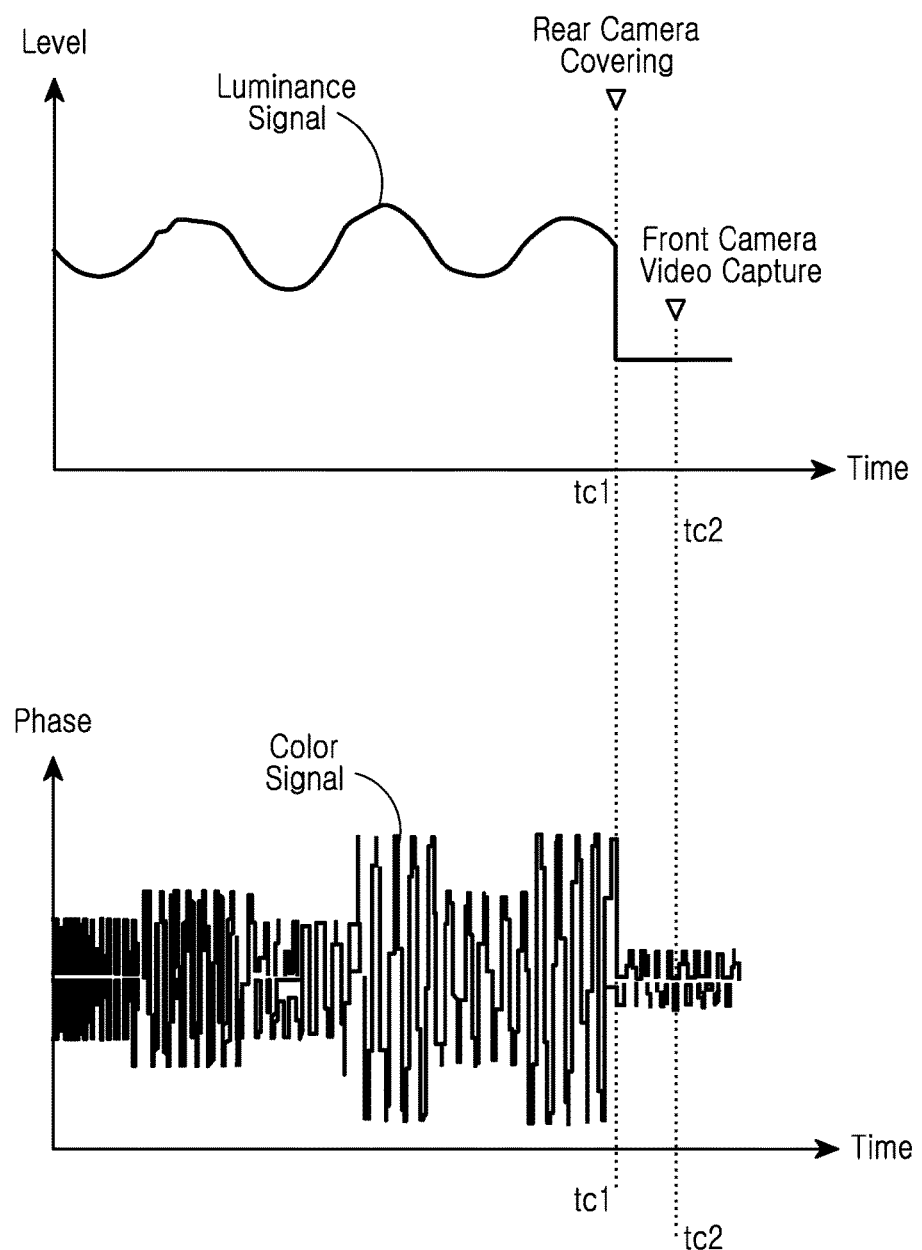
FIG. 9 is a graph illustrating a luminance signal and a color signal of a rear camera according to an embodiment of the present disclosure.

FIG. 9 is a graph illustrating a luminance signal and a color signal of a rear camera according to an embodiment of the present disclosure.

When determining the rear camera has been intentionally hidden by a user's finger based on an image change of the rear camera, the processor 120 captures an image of the front camera. The determination is based on a change in at least one of a luminance component and a color component of the rear camera image.

For example, referring to FIG. 9, in the case where a user intentionally hides the rear camera with his finger, and the like, a level of a luminance signal among image signals of the rear camera lowers suddenly, and a state that changes to a phase of specific color (e.g., red) may be maintained for a certain time (e.g., 1 second or more).

For reference, in case of a smartphone, since a front side of the rear camera is covered with a cover, such as transparent glass, plastic, and the like, even when a user hides a front side of the rear camera with his finger, and the like, a lens of the rear camera is not damaged, and an image of red color may be shot due to blood, and the like, of the user's finger.

The processor 120 may monitor at least one of a level of a luminance signal that changes for a certain time or more, and a phase of a color signal to automatically capture an image of the front camera. The processor 120 may determine whether the rear camera has been intentionally hidden by a user based on a change in at least one of a luminance component and a color component of pixels set as a plurality of representative points inside a video frame of the rear camera image.

Figures 10A, 10B:
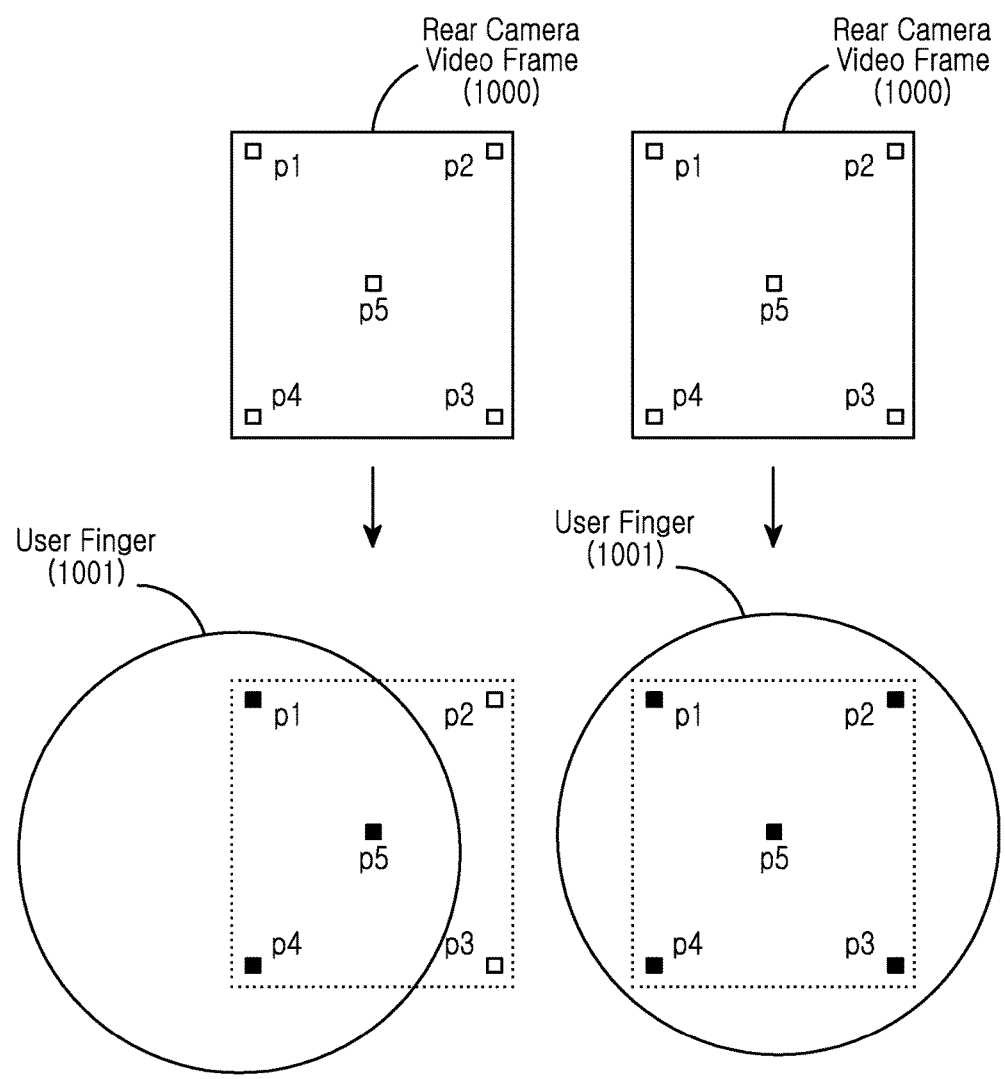
FIGS. 10A and 10B illustrate monitoring a luminance signal and a color signal for a partial pixel of a rear camera according to an embodiment of the present disclosure.

FIGS. 10A and 10B illustrate monitoring a luminance signal and a color signal for a partial pixel of a rear camera according to various embodiments of the present disclosure.

For example, referring to FIGS. 10A and 10B, the processor 120 monitors levels of luminance signals for five pixels p1~p5 set to four portions of outer corners and a center portion, respectively, among a video frame 1000 of the rear camera image, and when levels of luminance signals in three pixels (e.g., p1, p2, p3) lower suddenly, the processor 120 determines the rear camera has not been hidden by a user's finger 1001, and the like.

In contrast, all of levels of luminance signals for the five pixels p1~p5 lower suddenly, the processor 120 determines the rear camera has been hidden by a user's finger 1001, and the like, and automatically captures an image of the front camera. This is for determining whether the user has completely hidden the rear camera with his finger, and the like, while reducing power consumption generated by execution of the rear camera.

Methods according to claims of various embodiments of the present disclosure may be implemented in the form of a hardware, a software, or a combination of a hardware and a software. In case of implementation using a software, a computer-readable storage medium storing one or more programs (software modules) may be provided. One or more programs stored in the computer-readable storage medium are configured for execution by one or more processors inside the electronic device. One or more programs may include instructions allowing the electronic device to execute methods according to claims of various embodiments of the present disclosure.

Certain aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), Compact Disc-ROMs (CD-ROMs), magnetic tapes, floppy disks, and optical data storage devices. The non-transitory computer readable recording medium can also be distributed over network coupled computer systems so that the computer readable code is stored and executed in a distributed fashion. In addition, functional programs, code, and code segments for accomplishing the present disclosure can be easily construed by programmers skilled in the art to which the present disclosure pertains.

At this point it should be noted that the various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include a ROM, a RAM, CD-ROMs, magnetic tapes, floppy disks, and optical data storage devices. The processor readable mediums can also be distributed over network coupled computer systems so that the instructions are stored and executed in a distributed fashion. In addition, functional computer programs, instructions, and instruction segments for accomplishing the present disclosure can be easily construed by programmers skilled in the art to which the present disclosure pertains.

In addition, the program may be stored in an attachable storage device that may access the electronic device via a communication network, such as the Internet, an Intranet, a Local Area Network (LAN), a Wide LAN (WLAN), a Storage Area Network (SAN), a communication network, and the like, configured using a combination of these. This storage device may access the device performing an embodiment of the present disclosure via an external port. In addition, a separate storage device on a communication network may access a device performing an embodiment of the present disclosure.

In the various embodiments of the present disclosure, an included element has been expressed in the form of the singular or the plural depending on a proposed specific embodiment of the present disclosure. However, expression of the singular or the plural has been selected so that it is suitable for a proposed circumstance for convenience in description, and various embodiments of the present disclosure are not limited to a singular or plural element. Even an element expressed as the plural may be configured as the singular, or even an element expressed as the singular may be configured as the plural.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling camera photographing in an apparatus that uses a multi-camera, the method comprising:
   activating a first camera and a second camera in response to detecting an event, the event being entry into a self-camera mode by the first camera, wherein the second camera is further activated once a predetermined time has elapsed after the first camera is activated;
   displaying a camera shutter, and an image received from the activated first camera on a screen; and
   capturing the image using the first camera in response to detecting a predefined input obtained via the second camera while the camera shutter is displayed on the screen.

2. The method of claim 1,
   wherein the first camera is a camera photographing in one direction of the apparatus, and
   wherein the second camera is a camera photographing in another direction different from the photographing direction of the first camera.

3. The method of claim 1,
   wherein the first camera performs photographing at a maximum resolution, and
   wherein the second camera performs photographing at a resolution lower than the maximum resolution.

4. The method of claim 1, wherein the activating of the first camera and the second camera comprises:
   activating the first camera when the event is detected; and
   activating the second camera when the activation of the first camera is maintained for the predetermined time.

5. The method of claim 1, wherein the displaying of the image comprises displaying the image captured by the first camera as a main image and displaying an image received from the second camera as a sub-image of a smaller size than a size of the main image.

6. The method of claim 5, wherein the sub-image overlaps the main image or is displayed within a region where one or more icons are displayed.

7. The method of claim 1, wherein the capturing of the image by the first camera comprises capturing the image using the first camera when it is determined that a lens of the second camera has been intentionally hidden based on information of an image received from the second camera.

8. The method of claim 7, wherein the capturing of the image by the first camera is performed during a self-camera mode.

9. The method of claim 7, wherein the determination is based on a change in at least one of a luminance component or a color component of the image received from the second camera.

10. The method of claim 9, wherein the determination comprises determining the lens of the second camera has been intentionally hidden when the change in the at least one of the luminance component or the color component of the image received from the second camera occurs for all of pixels of the second camera.

11. The method of claim 7, wherein the determination is based on a change in at least one of a luminance component or a color component of pixels set as a plurality of representative points inside the image received from the second camera.

12. The method of claim 11, wherein the determination comprises determining the lens of the second camera has been intentionally hidden when the change in the at least one of the luminance component or the color component of the pixels set as the plurality of representative points occurs for all of the pixels.

13. An electronic device comprising:
a display;
a first camera;
a second camera;
a memory configured to store computer program instructions therein; and
at least one processor,
wherein the computer program instructions, when executed, configure the at least one processor to:
activate the first camera and the second camera in response to detecting an event, the event being entry into a self-camera mode by the first camera, wherein the second camera is further activated once a predetermined time has elapsed after the first camera is activated,
display a camera shutter, and an image received from the activated first camera on the display, and
capture the image using the first camera in response to detecting a predefined input obtained via the second camera while the camera shutter is displayed on the display.

14. The electronic device of claim 13,
wherein the first camera is a camera configured to photograph in one direction of the apparatus, and
wherein the second camera is a camera configured to photograph in another direction different from the photographing direction of the first camera.

15. The electronic device of claim 13, wherein the at least one processor is further configured to:
set the first camera to perform photographing at a maximum resolution, and
set the second camera to perform photographing at a resolution lower than the maximum resolution.

16. The electronic device of claim 13, wherein the at least one processor is further configured to:
activate, when the event is detected, the first camera, and
activate, when the activation of the first camera is maintained for the predetermined time, the second camera.

17. The electronic device of claim 13, wherein the at least one processor is further configured to:
display the image captured by the first camera as a main image, and
display an image received from the second camera as a sub-image of a smaller size than a size of the main image.

18. The electronic device of claim 17, wherein the sub-image overlaps the main image or is displayed within a region where one or more icons are displayed.

19. The electronic device of claim 13, wherein the at least one processor is further configured to capture the image using the first camera when it is determined that a lens of the second camera has been intentionally hidden based on information of an image received from the second camera.

20. The electronic device of claim 19, wherein the at least one processor is further configured to determine the second camera has been intentionally hidden based on a change in at least one of a luminance component or a color component of the image received from the second camera.

21. The electronic device of claim 20, wherein the at least one processor is further configured to determine the second camera has been intentionally hidden when the change in the at least one of the luminance component or the color component of the image received from the second camera has occurred for all of pixels of the second camera.

22. The electronic device of claim 19, wherein the at least one processor is further configured to determine the second camera has been intentionally hidden based on a change in at least one of a luminance component or a color component of pixels set as a plurality of representative points inside a video frame of an image received from the second camera.

23. The electronic device of claim 22, wherein the at least one processor is further configured to determine the second camera has been intentionally hidden when the change in the at least one of the luminance component or the color component of pixels set as the plurality of representative points inside the video frame of the image received from the second camera has occurred for all of the pixels.

24. A non-transitory computer-readable recordable medium on which a computer program for executing a method is recorded, the method comprising:
activating a first camera and a second camera in response to detecting an event, the event being entry into a self-camera mode by the first camera, the second camera being activated in a reduced power consumption mode, wherein the second camera is further activated once a predetermined time has elapsed after the first camera is activated;
displaying a camera shutter and an image received from the activated first camera on a screen; and
capturing the image using the first camera in response to detecting a predefined input obtained via the second camera while the camera shutter is displayed on the screen.

* * * * *